US009400972B2

(12) United States Patent
McKee et al.

(10) Patent No.: US 9,400,972 B2
(45) Date of Patent: Jul. 26, 2016

(54) WEIGHTING SOCIAL NETWORK RELATIONSHIPS BASED ON COMMUNICATIONS HISTORY

(75) Inventors: Martin W. McKee, Herndon, VA (US); Paul T. Schultz, Colorado Springs, CO (US); Robert A. Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1243 days.

(21) Appl. No.: 12/424,871

(22) Filed: Apr. 16, 2009

(65) Prior Publication Data

US 2010/0268830 A1  Oct. 21, 2010

(51) Int. Cl.
*G06F 15/16* (2006.01)
*G06Q 10/10* (2012.01)
*G06Q 50/00* (2012.01)

(52) U.S. Cl.
CPC ............... *G06Q 10/10* (2013.01); *G06Q 50/01* (2013.01)

(58) Field of Classification Search
CPC ...................................................... G06Q 50/01
USPC ............. 709/206, 229, 228; 705/8, 26.8, 319; 707/3, 784
See application file for complete search history.

(56) References Cited

U.S. PATENT DOCUMENTS

| | | | | |
|---|---|---|---|---|
| 7,539,697 | B1 * | 5/2009 | Akella | G06F 17/30958 |
| 7,680,703 | B1 * | 3/2010 | Smith | 705/26.8 |
| 7,856,449 | B1 * | 12/2010 | Martino et al. | 707/784 |
| 2007/0226248 | A1 * | 9/2007 | Darr | G06Q 10/10 |
| 2007/0266097 | A1 * | 11/2007 | Harik | G06Q 30/02 709/204 |
| 2008/0134053 | A1 * | 6/2008 | Fischer | G06Q 10/02 715/747 |
| 2009/0070412 | A1 * | 3/2009 | D'Angelo | G06Q 10/10 709/203 |
| 2009/0177744 | A1 * | 7/2009 | Marlow | G06Q 10/10 709/204 |
| 2009/0271370 | A1 * | 10/2009 | Jagadish | G06Q 10/10 |
| 2009/0292814 | A1 * | 11/2009 | Ting et al. | 709/229 |
| 2010/0057858 | A1 * | 3/2010 | Shen | H04L 12/58 709/206 |
| 2010/0132049 | A1 * | 5/2010 | Vernal | G06F 21/6245 726/27 |
| 2010/0161369 | A1 * | 6/2010 | Farrell et al. | 705/8 |
| 2010/0241580 | A1 * | 9/2010 | Schleier-Smith | 705/319 |
| 2011/0231240 | A1 * | 9/2011 | Schoen | G06Q 30/0242 705/14.41 |
| 2012/0001919 | A1 * | 1/2012 | Lumer | G06F 17/30705 345/440 |
| 2013/0254215 | A1 * | 9/2013 | Davar | G06F 17/30861 707/748 |

OTHER PUBLICATIONS

Garton et al., "Studying Online Social Networks", JCMC 3 (1); SIG Group Bulletin, Jun. 1997, pp. 1-32.*

(Continued)

*Primary Examiner* — Imad Hussain

(57) ABSTRACT

A method may include receiving or retrieving session information associated with one or more electronic communications that occurred outside of the social network site and included users of the social network site, comparing the session information with information associated with the users of the social network site, selecting one of the users as a user of the social network site and one or more of the users as one or more connections of the selected user of the social network site, based on the comparing, generating a weighted social graph for the selected user of the social network site, based on the session information, generating social network information based on the weighted social graph, and providing the social network information to at least one of the selected user of the social network site or the selected one or more connections of the user of the social network site.

19 Claims, 14 Drawing Sheets

(56) References Cited

OTHER PUBLICATIONS

Towle, "Measuring and Evaluating the Underlying Social Networks of Visual Blog Communities", CSCW Workshop on social Networks, Nov. 2004.*

Borgatti, "UNCINET 6 for Windows Software for Social Network Analysis", User Guide, 1999-2002, Analytic Technologies, Inc., pp. 1-47.*

* cited by examiner

WEIGHTING SOCIAL NETWORK RELATIONSHIPS BASED ON COMMUNICATIONS HISTORY

BACKGROUND

Social networks are increasingly becoming a popular platform for individuals or organizations to communicate with one another. Typically, a social network allows individuals or organizations to share interests, ideas, beliefs, and/or views, develop friends or business relationships, sustain communication with existing friends or family, or simply provide an open forum for anyone to communicate.

Given the expansive nature and various forms of communication available today, users of social networks can accumulate a large number of "connections."

BRIEF DESCRIPTION OF THE DRAWINGS

FIGS. 10A-10C are diagrams illustrating exemplary GUIs that show social network information associated with user presence information;

DETAILED DESCRIPTION OF PREFERRED EMBODIMENTS

Figure 1:
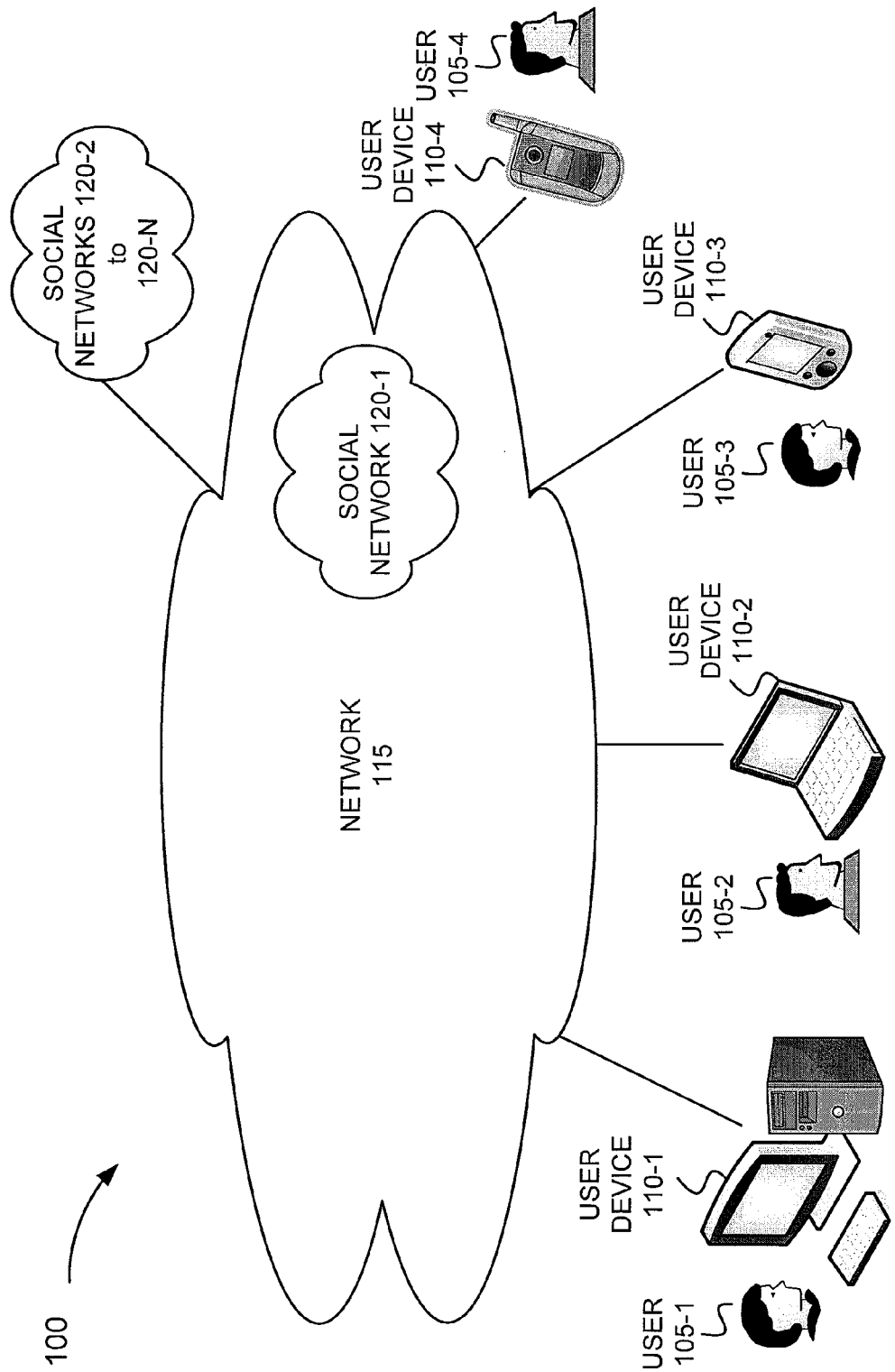
FIG. 1 is a diagram illustrating an overview of exemplary embodiments described herein.

The following detailed description refers to the accompanying drawings. The same reference numbers in different drawings may identify the same or similar elements. Also, the following detailed description does not limit the invention.

The term "connection," as used herein, is intended to be broadly interpreted to include a social network contact. The social network contact may correspond to an individual, a group of individuals, or an entity (e.g., a business).

The term "social graph" or "weighted social graph," as used herein, is intended to be broadly interpreted to correspond to a user's connections and a user's relational links with these connections. A relational link between the user and a connection signifies a relationship between the user and the connection. Relational links in the weighted social graph may be weighted. A weight assigned to a relational link may be based on a communication history associated with communications between the user and the connection. The weight may correspond to a level of importance of the connection, from the perspective of the user. The communication between the user and the connection may occur outside of the social network.

Embodiments described herein relate to utilizing session information occurring outside of a social network. In one embodiment, a weighting scheme, based on the session information, may be utilized to create relational links between the user and connections associated with the social network. For example, the weight assigned to the relational link may be based on quantifiable information, such as, for example, the user's communications history with the connection. In one implementation, the more frequently the user communicates with the connection, the greater the weight that may be assigned to the relational link. Additionally, or alternatively, other parameters related to the user's communication history may be considered, such as, for example, the type of communications (e.g., e-mail, telephone), the direction of the communications (e.g., from the user to the connection or from the connection to the user), the duration of the communications, the communication addresses (e.g., home telephone number, business telephone number), name information, and/or address information.

Based on such a weighting scheme, the social network may, for example, prioritize presentation of information (e.g., postings) to the user or delivery of communications to the user according to the user's weighed social graph. As will be described, the weighted social graph may include connections and the weighted relational links, from the perspective of the user.

Additionally, the social network may, for example, sort the user's connection list based on the user's weighted social graph, or sort the user's connection list based on the most recent activity with connections in the user's weighted social graph. The social network may also provide a detailed communication history with respect to connections (e.g., based on the session information) in conjunction with the connection's activity history on the social network. The social network may prioritize an order in which the user may communicate with his or her connections based on the user's weighted social graph. The social network may also identify a preferred form of communication with connections of the user's weighted social graph. The social network may allow the user to control, the level or degree of disclosure of presence of the user to his or her connections, based on the weighted social graph. Also, the social network may rank or prioritize input (e.g., comments) from connections, which the user may view during a debate, a commentary and/or a decision-making process, based on the weighted social graph.

As described herein, by overlaying information about the user's communication history (e.g., based on the session information) within the user's social graph, the social network may automatically manage relational links of the user's social graph and dynamically adapt various services provided to the user via the social network, as well as improve the user's interaction with his or her social graph.

FIG. 1 is a diagram illustrating an overview of exemplary embodiments described herein. As illustrated in FIG. 1, an exemplary environment 100 may include users 105-1 through 105-4 (referred to generally as user(s) 105), user devices 110-1 through 110-4 (referred to generally as user device(s) 110), a network 115 that may include a social network 120-1, and network 115 may be connected to (e.g., communicatively coupled to) social networks 120-2 to 120-N (referred to generally as social network(s) 120).

User device 110 may include a device having communication capability. By way of example, user device 110 may include a wireless telephone (e.g., a mobile phone, a cellular phone), a computational device (e.g., a computer), a personal digital assistant (PDA), a web-browsing device, a personal communication systems (PCS) device, a television and (e.g., a set top box and/or a remote control), a vehicle-based device, and/or some other type of portable, mobile, stationary, or handheld device.

Network 115 may include one or multiple networks of any type (i.e., wired and/or wireless). For example, network 115 may include a local area network (LAN), a wide area network (WAN), a telephone network, such as a Public Switched Telephone Network (PSTN), a cellular network, or a Public Land Mobile Network (PLMN), a satellite network, an intranet, the Internet, a data network, and/or a private network. Social network 120 may correspond to a social networking on-line site and/or system that allow individuals to interact.

In an exemplary implementation, network 115 may collect session information related to communications to and from users 105. The session information may include, for example, the individuals involved in the communication (e.g., the names of the individuals), the type of communication (e.g., telephone, e-mail, short messaging service (SMS), multimedia messaging service (MMS), paging, video session, etc.), communication address information (e.g., telephone number, e-mail address, etc.), the duration of the communication, as well as other types of information that may be attributed to session information. Network 115 may provide the session information to social network 120. Based on the session information, social network 120 may perform a lookup to determine whether the session information corresponds to information in social network 120. For example, social network 120 may determine whether a name or a telephone number from the session information corresponds to a name or a telephone number of an individual (e.g., a subscriber or a participant) in social network 120. Based on a comparison between the session information and the information in social network 120, social network 120 may construct a weighted social graph for the user in social network 120.

Once the weighted social graph is created, social network 120 may, for example, prioritize presentation of information, sort connection lists, prioritize an order in which the user may communicate with his or her connections, and/or provide different levels of disclosure of presence information, for the user. Social network 120 may perform other types of services, as described herein, for the user.

As a result of the foregoing, by utilizing the user's communication history with respect to connections, social network 120 may automatically create and/or manage the user's weighted social graph and dynamically adapt various services provided to the user via the social network, as well as improve the user's interaction with his or her weighted social graph.

Since exemplary embodiments and implementations have been broadly described, variations to the above embodiments and implementations exist, and will be discussed further below.

It will be appreciated that the collecting of session information and creating weighted social graphs for users may involve multiple entities. For example, referring to FIG. 1, network 115 may be owned, operated, and/or managed by one entity (e.g., a service provider or a network operator), while social networks 120-2 to 120-N may be owned, operated, and/or managed by other entity(ies) (e.g., a social network provider(s)). In such instances, it is assumed that a business relationship might exist between the two (or more entities). By way of example, network 115 may be owned, operated, and/or managed by a service provider, such as Verizon, while social networks 120-2 to 120-N may correspond to social networks, such as, for example, LinkedIn, Facebook, MySpace, etc., which may be owned, operated, and/or managed by social network providers. Alternatively, referring to FIG. 1, network 115 may be owned, operated, and/or managed by a same entity as social network 120-1. By way of example, Verizon may own, operate, and/or manage network 115 and may offer social network services (e.g., social network 120-1) to their subscribers.

Figure 2:
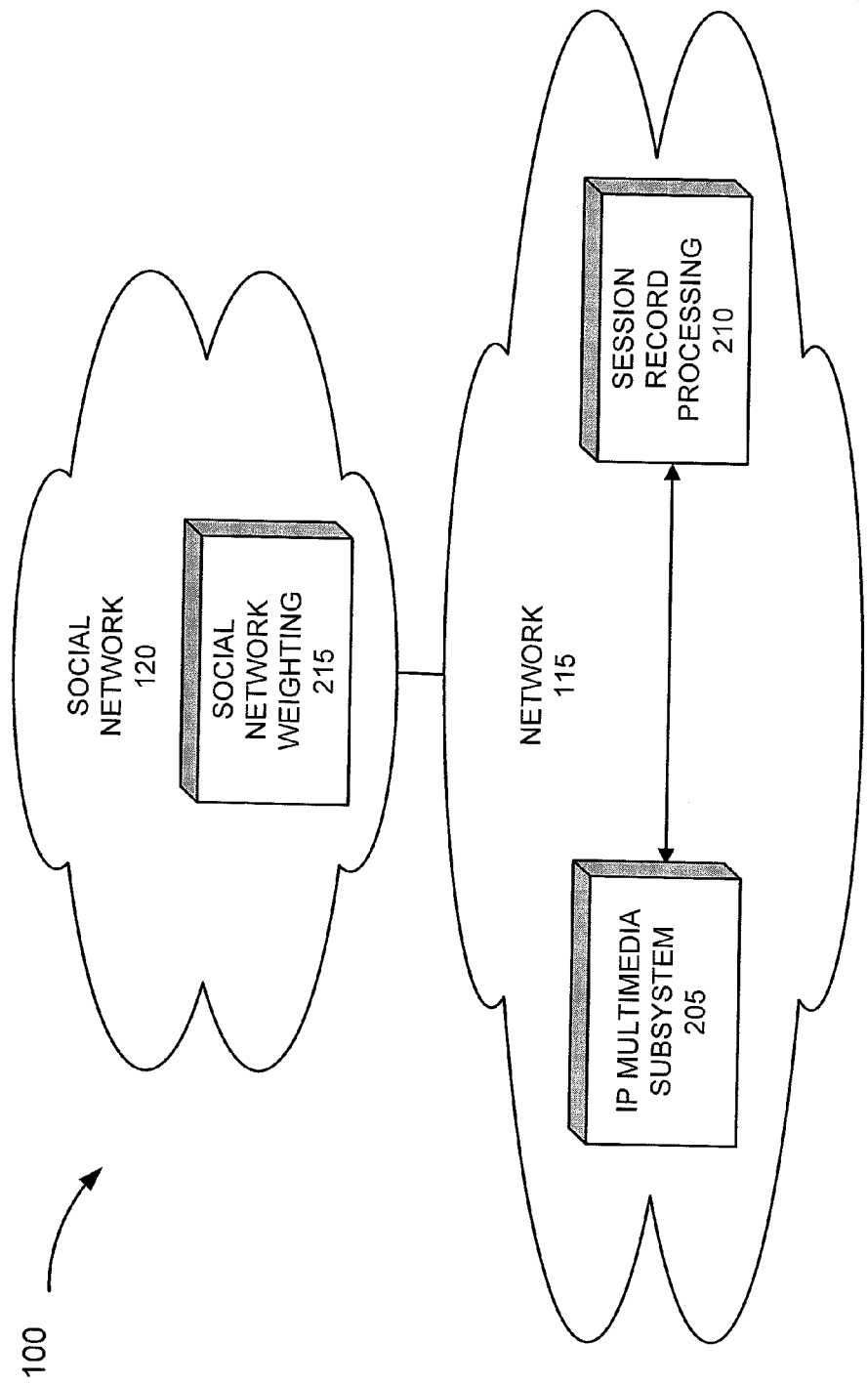
FIG. 2 is a diagram of exemplary functional components for collecting session information and creating a social graph based on a weighting scheme.

FIG. 2 is a diagram of exemplary functional components for collecting session information and creating a social graph based on a weighting scheme. As illustrated in FIG. 2, network 115 may include an IP multimedia subsystem component (IMS) 205, and a session record processing component (SRP) 210. Additionally, social network 120 may include a social network weighting component (SNW) 215.

IMS 205 may include one or a group of devices that, among other things, provide a variety of multimedia services (e.g., voice, video, data, SMS, MMS, etc.) to users (e.g., person-to-person communication, person-to-group communication, and person-to-content communication). IMS 205 may collect or receive session information associated with the multimedia services provided. IMS 205 may include, for example, a server, a data center, a computer, and/or some other type of network device.

SRP 210 may include one or multiple devices that, among other things, detect, monitor, collect, receive, and/or manage session information associated with communications in or via network 115. Depending on the type of communication, the content of the session information may be different. SRP 210 may include, for example, a server, a data center, a computer, and/or some other type of network device.

SNW 215 may include one or multiple devices that, among other things, generate weighted social graphs for users based on session information received from network 115 (e.g., IMS 205 and/or SRP 210). The session information may be sent to social network 120 and/or social network 120 may retrieve the session information from network 115 via a real-time feed or retrieval arrangement, a periodic feed or retrieval arrangement, or some other type of user-configured arrangement. The weighted social graph may be associated with the user and the user's connections. The weighted social graph may include relational links between the user and the user's connections. SNW 215 may apply a weighting scheme to each relational link. The weighting calculus (i.e., the weighting scheme) may be user-configured. By way of example, the weight of the relational link, between the user and the connection, may be selected based on parameters associated with a communication history between the user and the connection. For example, the number of communications, the type of communications, the direction of the communications (e.g., from the user to the connection or from the connection to the user), the duration of the communications, the communication addresses (e.g., home telephone number versus business telephone number), name information (e.g., relative or family member), and/or address information (e.g., lives with connection, lives near or far from connection) may be utilized to determine the weight of the relational link. SNW 215 may also generate weighted social graphs based on the session information from network 115 and social network activity.

Although FIG. 2 illustrates exemplary functional components, in other implementations, fewer, additional, and/or different functional components, or a different arrangement of functional components than those illustrated in FIG. 2, and described herein, may be implemented.

Figure 3:
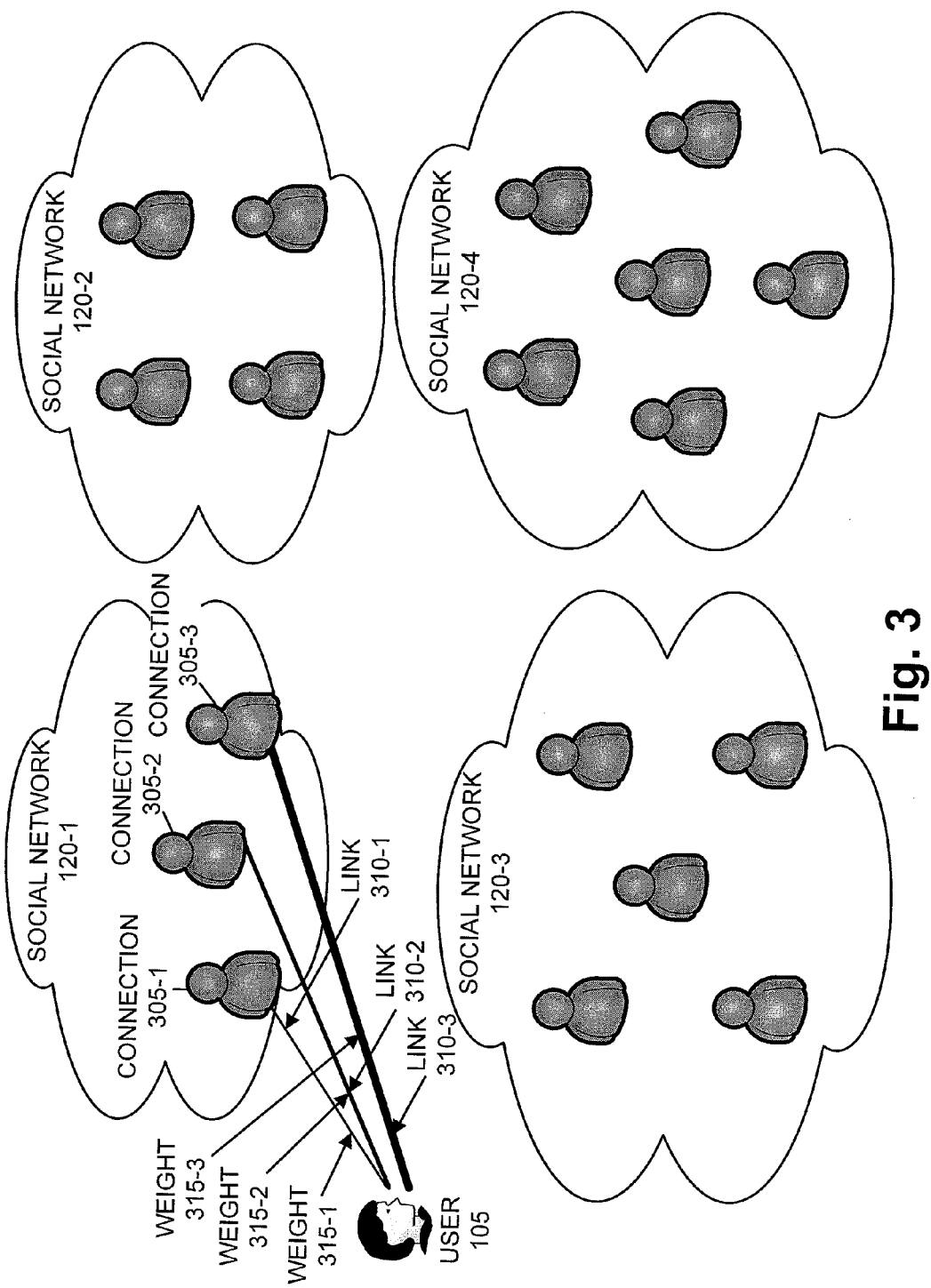
FIG. 3 is a diagram illustrating an exemplary weighted social graph.

FIG. 3 is a diagram illustrating an exemplary weighed social graph scheme. As illustrated, user 105 may belong to or interact with social networks 120-1 through 120-4. Each social network 120 may, from the perspective of user 105, include connections. For example, as illustrated in FIG. 3, social network 120-1 may include connections 305-1, 305-2, and 305-3 (referred to generally as connection 305) that have relational links 310-1, 310-2, and 310-3 (referred to generally as relational link 310), respectively, with user 105. As further illustrated, each relational link 310 may be assigned a corresponding weight 315-1, 315-2, and 315-3 (referred to generally as weight 315). Weight 315 may correspond to a level of strength or importance of connection 305, from the perspective of user 105. As previously described, the calculation of weight 315 may be based on session information (i.e., communication history) associated with user 105 and a particular connection 305. Although not illustrated, user 105 may have connections 305 in social networks 120-2 through 120-4. Similarly, each relational link 310 between connections 305 in social networks 120-2 through 120-4 may be assigned a corresponding weight 315.

Figure 4:
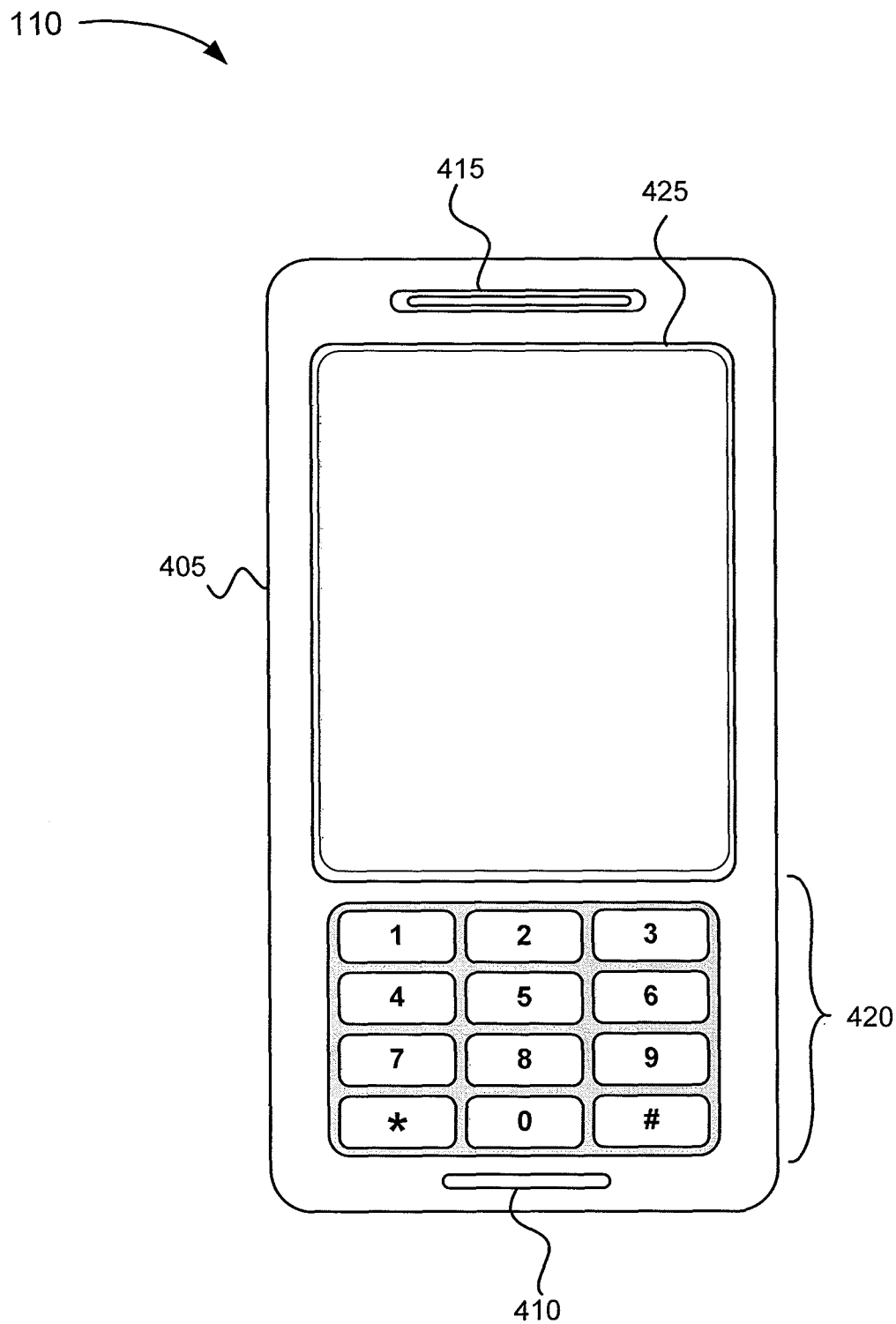
FIG. 4 is a diagram of an exemplary user device in which the embodiments described herein may be implemented.

FIG. 4 is a diagram of an exemplary user device 110 in which the embodiments described herein may be implemented. As illustrated in FIG. 4, user device 110 may include a housing 405, a microphone 410, a speaker 415, a keypad 420, and a display 425. In other embodiments, user device 110 may include fewer, additional, and/or different components, or a different arrangement of components than those illustrated in FIG. 4 and described herein.

Housing 405 may include a structure to contain components of user device 110. For example, housing 405 may be formed from plastic, metal, or some other material. Housing 405 may support microphone 410, speaker 415, keypad 420, and display 425.

Microphone 410 may transduce a sound wave to a corresponding electrical signal. For example, a user may speak into microphone 410 during a telephone call or to execute a voice command. Speaker 415 may transduce an electrical signal to a corresponding sound wave. For example, a user may listen to music or listen to a calling party through speaker 415.

Keypad 420 may provide input to user device 110. Keypad 420 may include a standard telephone keypad, a QWERTY keypad, and/or some other type of keypad. Keypad 420 may also include one or more special purpose keys. In one implementation, each key of keypad 420 may be, for example, a pushbutton. A user may utilize keypad 420 for entering information, such as text or activating a special function.

Display 425 may output visual content and may operate as an input component. For example, display 425 may include a liquid crystal display (LCD), a plasma display panel (PDP), a field emission display (FED), a thin film transistor (TFT) display, or some other type of display technology. Display 425 may display, for example, text, images, and/or video information to a user. In one implementation, display 425 may include a touch-sensitive screen. Display 425 may correspond to a single-point input device (e.g., capable of sensing a single touch) or a multipoint input device (e.g., capable of sensing multiple touches that occur at the same time). Display 425 may implement, for example, a variety of sensing technologies, including but not limited to, capacitive sensing, surface acoustic wave sensing, resistive sensing, optical sensing, pressure sensing, infrared sensing, gesture sensing, etc.

Figure 5:
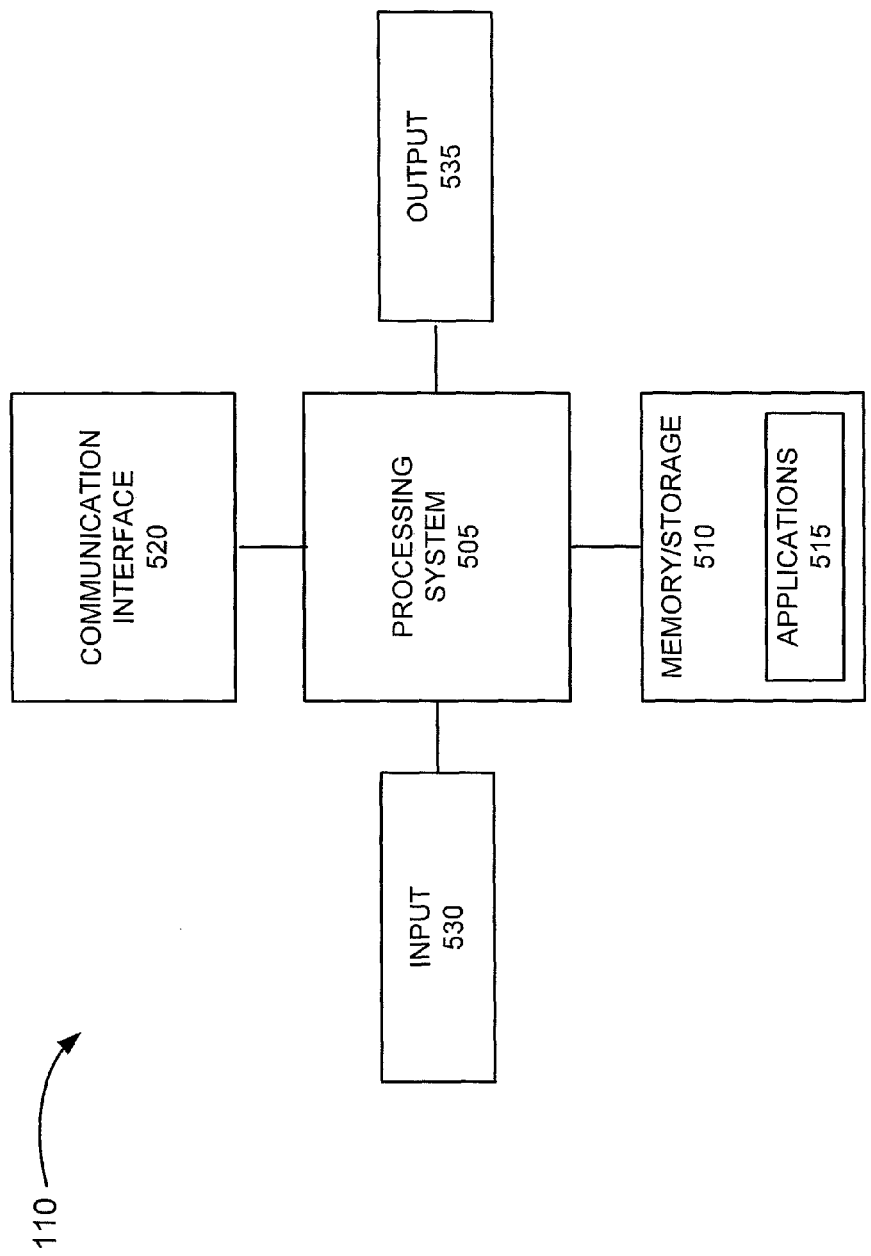
FIG. 5 is a diagram illustrating exemplary components of the user device.

FIG. 5 is a diagram illustrating exemplary components of user device 110. As illustrated, user device 110 may include a processing system 505, a memory/storage 510, a communication interface 520, an input 530, and an output 535. In other embodiments, user device 110 may include fewer, additional, and/or different components, or a different arrangement of components than those illustrated in FIG. 5 and described herein.

Processing system 505 may include one or multiple processors, microprocessors, data processors, co-processors, network processors, application specific integrated circuits (ASICs), controllers, programmable logic devices, chipsets, field programmable gate arrays (FPGAs), and/or some other component that may interpret and/or execute instructions and/or data. Processing system 505 may control the overall operation (or a portion thereof) of user device 110 based on an operating system and/or various applications. Processing system 505 may interpret and/or execute instructions and/or data.

Memory/storage 510 may include memory and/or secondary storage. For example, memory/storage 510 may include a random access memory (RAM), a dynamic random access memory (DRAM), a read only memory (ROM), a programmable read only memory (PROM), a flash memory, and/or some other type of memory. Memory/storage 510 may include a hard disk (e.g., a magnetic disk, an optical disk, a magneto-optic disk, etc.) or some other type of computer-readable medium, along with a corresponding drive. The term "computer-readable medium," as used herein, is intended to be broadly interpreted to include a memory, a secondary storage, a compact disc (CD), a digital versatile disc (DVD), or the like. The computer-readable medium may be implemented in a single device, in multiple devices, in a centralized manner, or in a distributed manner.

Memory/storage 510 may store data, application(s), and/or instructions related to the operation of user device 110. For example, memory/storage 510 may include a variety of applications 515, such as, for example, an e-mail application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Communication interface 520 may permit user device 110 to communicate with other devices, networks, and/or systems. For example, communication interface 520 may include an Ethernet interface, a radio interface, a microwave interface, or some other type of wireless and/or wired interface.

Input 530 may permit a user and/or another device to input information in user device 110. For example, input 530 may include a keyboard, keypad 420, display 425, a touchpad, a mouse, a button, a switch, a microphone, an input port, voice recognition logic, and/or some other type of visual, auditory, etc., input component. Output 535 may permit user device 110 to output information to a user and/or another device. For example, output 535 may include display 425, speaker 415, one or more light emitting diodes (LEDs), an output port, a vibrator, and/or some other type of visual, auditory, tactile, haptic, etc., output component.

Figure 6:
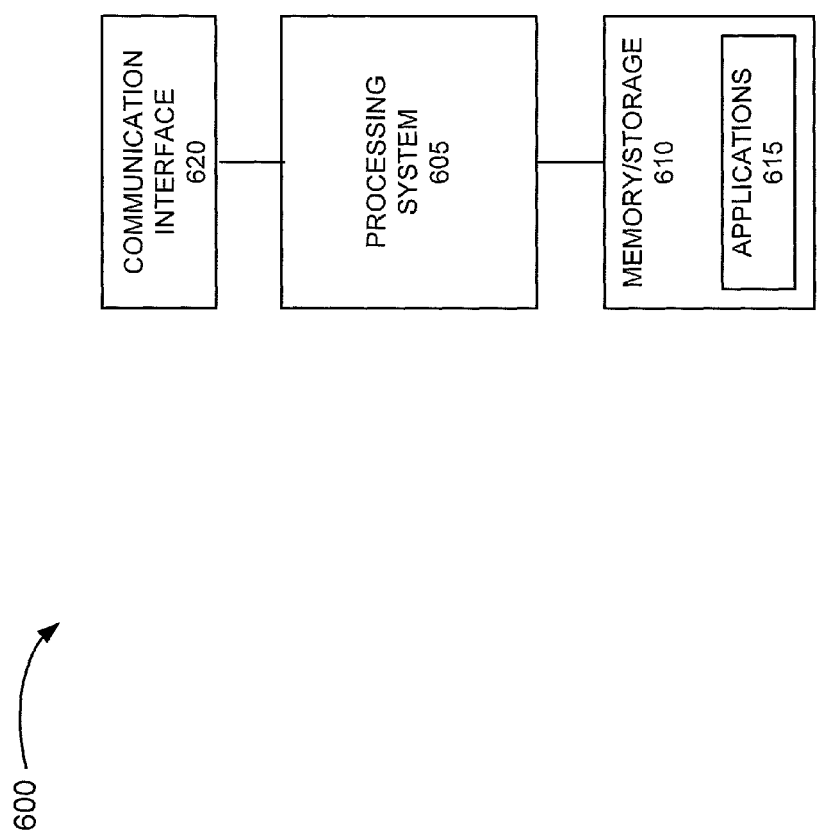
FIG. 6 is a diagram illustrating exemplary components of a device that may correspond to one or more devices in the network and/or the social network.

FIG. 6 is a diagram illustrating exemplary components of a device 600 that may correspond to one or more devices in network 115 and/or social network 120. For example, device 600 may correspond to devices associated with IMS 205, SRP 210, and/or SNW 215. As illustrated, device 600 may include a processing system 605, a memory/storage 610, and a communication interface 620. In other embodiments, device 600 may include fewer, additional, and/or different components, or a different arrangement of components than those illustrated in FIG. 6 and described herein.

Processing system 605 may include one or multiple processors, microprocessors, data processors, co-processors, network processors, ASICs, controllers, programmable logic devices, chipsets, FPGAs, and/or some other component that may interpret and/or execute instructions and/or data. Processing system 605 may control the overall operation (or a portion thereof) of device 600 based on an operating system and/or various applications. Processing system 605 may interpret and/or execute instructions and/or data.

Memory/storage 610 may include memory and/or secondary storage. For example, memory/storage 610 may include a RAM, a DRAM, a ROM, a PROM, a flash memory, and/or some other type of memory. Memory/storage 610 may include a hard disk (e.g., a magnetic disk, an optical disk, a magneto-optic disk, solid state disk, etc.) or some other type of computer-readable medium, along with a corresponding drive.

Memory/storage 610 may store data, application(s), and/or instructions related to the operation of device 600. For example, in the instance that device 600 corresponds to IMS 205, memory/storage 610 may include applications 615, such as, for example, to provide and/or deliver multimedia services to users 105. Applications 615 may also detect, monitor, collect, receive, and/or manage session information. Alternatively, in the instance that device 600 corresponds to SRP 210, memory/storage 610 may include applications 615, such as, for example, to detect, monitor, collect, receive, and/or manage session information. Alternatively, in the instance that device 600 corresponds to SNW 215, memory/storage 610 may include applications 615, such as, for example, to generate weighted social graphs based on session information. Applications 615 may apply a weighting calculus to determine the weight assigned to a relational link. The weight of each parameter associated with session information (e.g., the type of communication, the duration of the communication, etc.), which is used for determining the weight of the relational link, may be user-configured. In one implementation, application 615 may compile information of one or multiple sessions associated with a communication history between the user and the connection in order to select the weight. SNW 215 may also process the session information to provide various social network services (e.g., prioritize presentation/delivery of information, sort connections list, etc.), as described herein, to the user.

Communication interface 620 may permit device 600 to communicate with other devices, networks, and/or systems. For example, communication interface 620 may include an Ethernet interface, a radio interface, a microwave interface, or some other type of wireless interface and/or wired interface.

As previously described, weighted relational links in the weighted social graph for a user may be used by the social network to prioritize presentation of information to the user, deliver communications, sort connections listed in a connection list, etc. Additionally, the social network may provide the user with other information that may enhance the user's experience in the social network.

Figure 7:
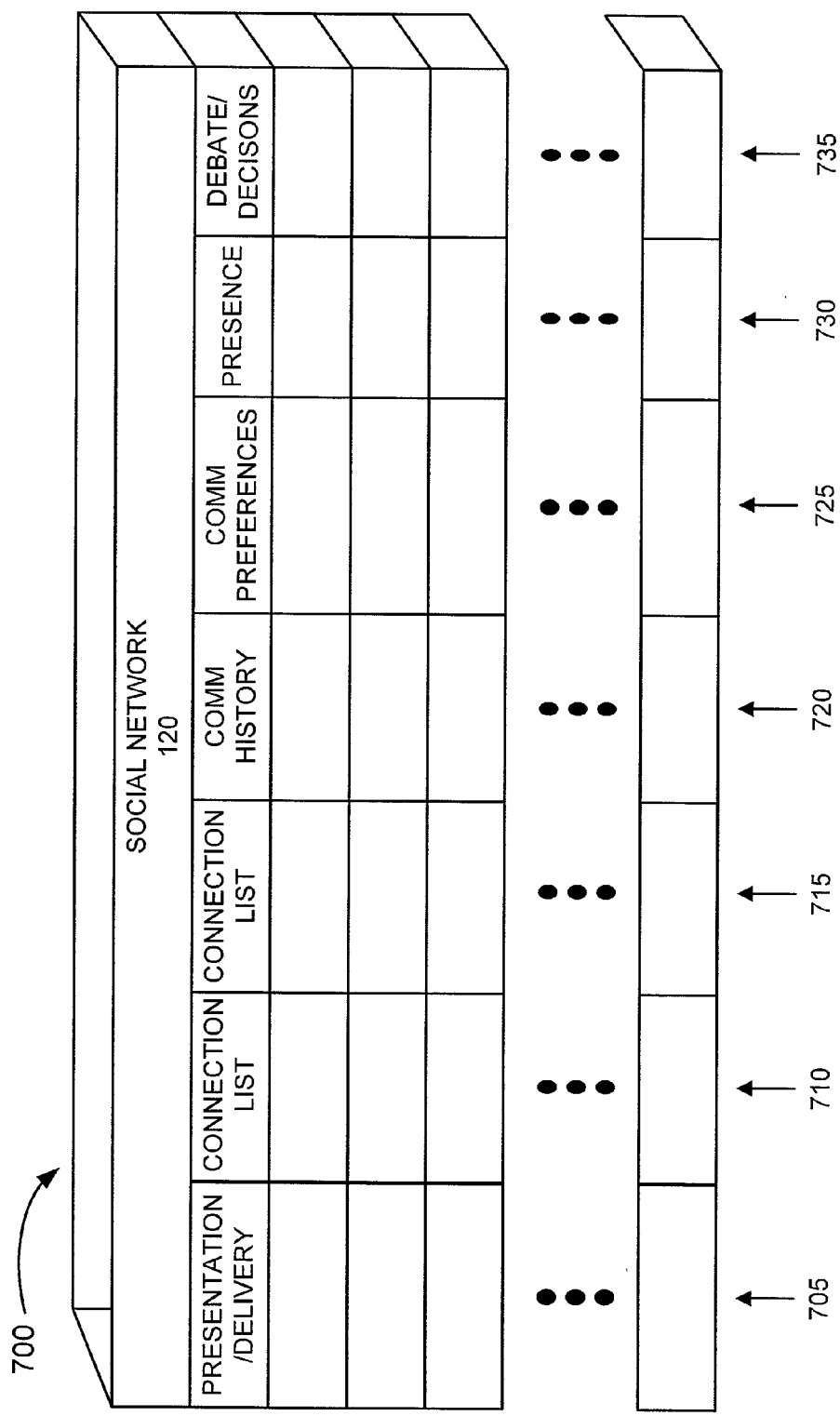
FIG. 7 is a diagram illustrating an exemplary database that includes information associated with a weighted social graph and/or communication history.

FIG. 7 is a diagram illustrating an exemplary database 700 that includes information associated with a weighted social graph and/or communication history. Database 700 may include a presentation/delivery field 705, a weighted connection list field 710, a temporal connection list field 715, a communication history field 720, a communication preferences field 725, a presence field 730, and a debate/decisions field 735. The term "database," as used herein, is intended to be broadly interpreted to include an arrangement of data. For example, a database may correspond to a table or some other type of data structure. Database 700 (or portions thereof) may be stored in memory/storage 610 of device 600.

Presentation/delivery field 705 may include information for presenting and delivering social network activity based on the weighted relational links in the user's weighted social graph. For example, social network 120 may prioritize the presentation and/or delivery of information associated with social network activity (e.g., postings, news feed, communications, etc.) according to the weight assigned to the weighted relational link. Presentation/delivery field 705 may include information for prioritizing an order in which the user communicates with his or her connections based on the weighted relational links in the user's weighted social graph. For example, in the instance that multiple connections each initiate an IM session with the user. Social network 120 may prioritize an order in which the user communicates with the multiple connections based on the user's weighted social graph.

Weighted connection list field 710 may include information for sorting connections in a user's connections list based on the weighted relational links in the user's weighted social graph. For example, social network 120 may sort the user's connections in a connections list so that the most weighted connection is listed at the top of the connections list and the remaining connections are sorted in descending order according to their respective weighted relational links.

Temporal connection list field 715 may include information for sorting connections in a user's connections list based on how recent the user has communicated with each connection. For example, social network 120 may sort the user's connections in a connection list so that the connection, which the user has mostly recently communicated with, is listed at the top of the connections list, and the remaining connections are sorted in descending order according to the temporal aspects of communications. In one implementation, social network 120 may utilize the communication history from network 115 to determine the temporal ordering of connections. Additionally, or alternatively, the social network may determine the temporal ordering of connections based on communications conducted (e.g., while logged in) in social network 120.

Communication history field 720 may include communication history (e.g., session information) from network 115 and social network activity information. By way of example, SNW 215 may receive or retrieve communication history information from IMS 205 and/or SRP 210. Social network 120 may utilize the information contained in communication history field 720 to, for example, provide the user with the user's communication history (i.e., outside of the social network with the connection) and the connection's social network activity (e.g., status, postings, photos, videos, etc.) on social network 120.

Communication preferences field 725 may include communication history (e.g., session information) from network 115. For example, social network 120 may utilize the information contained in communication preferences field 725 to provide the user with a preferred method of communication with the user's connection based on the communication history associated with the user and the connection. In an example case, the connection may leave the user a posting on social network 120. Based on the communication history between the user and the connection, social network 120 may determine that the preferred method of communication with this connection is by e-mail because the connection is currently traveling overseas and is in a different time zone. For example, the communication history may reveal that the user has recently been communicating with the connection via e-mail.

Presence field 730 may include information corresponding to the weighted relational links in the user's weighted social graph and presence information. For example, social network 120 may utilize the information contained in presence field 730 to permit the user to disclose presence related information to connections based on their corresponding weighted relational links. For example, the user may set-up varying levels of presence information, where connections having a higher weighting may be provided with more specific information relating to the presence of the user.

Debate/decisions field 735 may include information that ranks or sorts feedback from connections with respect to, for example, a discussion form, based on the weighted social graph. The term "discussion forum," as used herein is intended to be broadly interpreted to include, for example, a discussion, a commentary, a debate, a decision-making process, or a feedback session. For example, social network 120 may utilize the information contained in debate/decisions field 735 to prioritize input (e.g., comments, feedback, etc.) from connections during the discussion forum according to the weight associated with the connection. In some implementations, the user may not see the comments or feedback (e.g., the comment or feedback may be dropped or omitted) of a connection having a weight below a user-configured threshold.

Although, FIG. 7 illustrates an exemplary database 700, in other implementations, fewer, additional, or different informational fields may be included. It will be appreciated that database 700 may be implemented in a distributed manner (e.g., among multiple devices (e.g., network servers, information repositories, etc.)) or in a centralized manner (e.g., on a single device).

Figure 8:
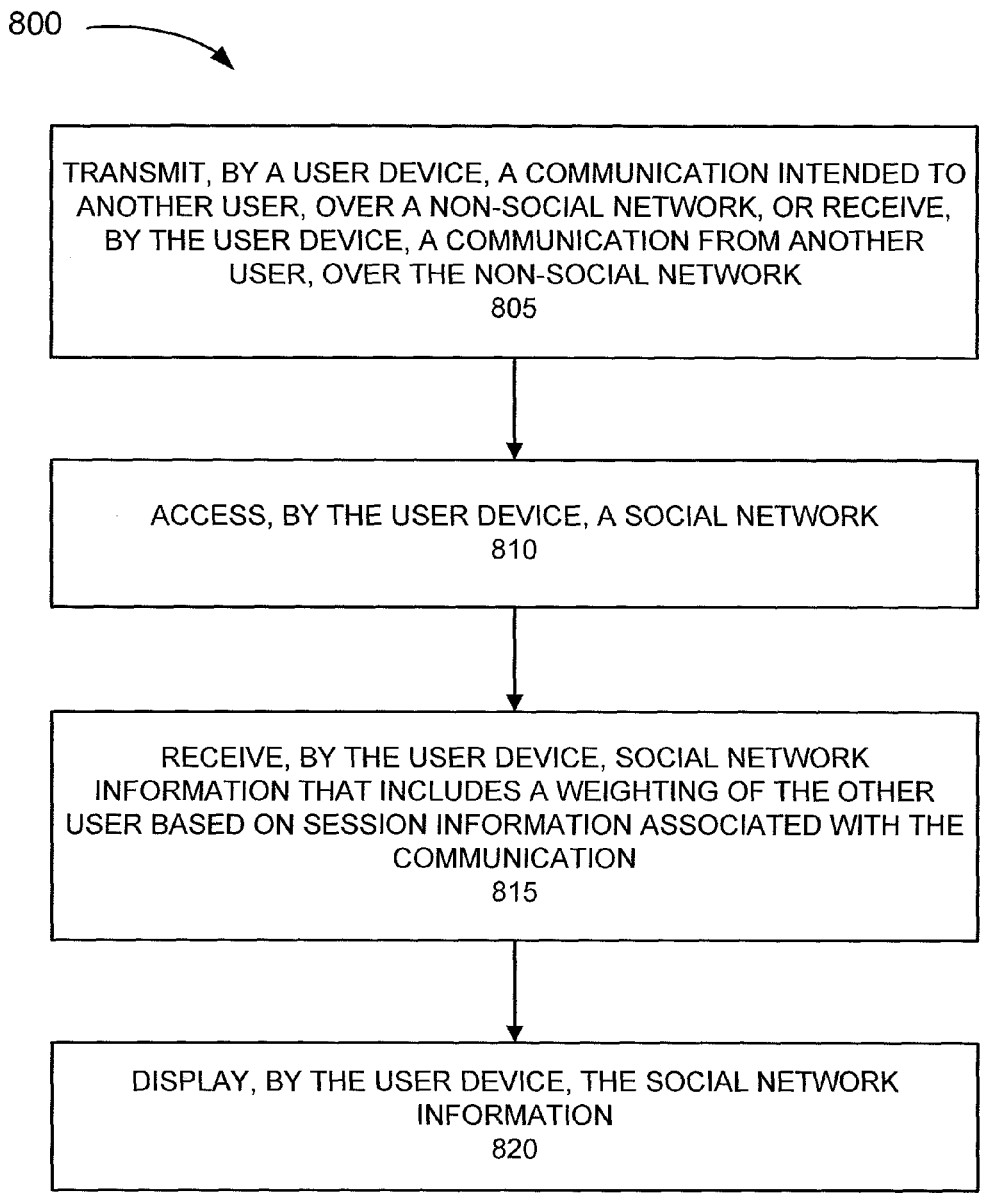
FIG. 8 is a flow diagram illustrating an exemplary process for providing social network information based on a weighted social graph.

FIG. 8 is a flow diagram illustrating an exemplary process 800 for providing social network information based on a weighted social graph. In one implementation, process 800 may be performed by user device 110.

Process 800 may begin with transmitting a communication intended to another user over a non-social network, or receiving a communication from another user over the non-social network (block 805). User 105 may transmit a communication (e.g., an e-mail, a telephone call, a video call, an SMS message, a MSM message, a page, or some other type of electronic message) to another user 105 via user device 110. Additionally, or alternatively, user 105 may receive a communication from another user 105 via user device 110. The communication transmitted or the communication received may occur over network 115 (i.e., outside of social network 120). It will be appreciated that one or multiple communications may occur.

A social network may be accessed (block 810). Subsequent to the transmitted or received communication(s), user device 110 may access social network 120. In some instances, user 105 may have to log-in to social network 120.

Social network information, that includes a weighting of the other user based on session information associated with the communication, may be received (block 815). For purposes of discussion, it is assumed that other user 105 corresponds to a connection in social network 120. As described herein, the session information may be used, by social network 120, to weight relational links associated with user's 105 weighted social graph on social network 120. In turn, the weighted social graph of user 105 may be used to provide user 105 with social network information via user device 110. The term "social network information," is to be broadly interpreted to include information based on the weighted social graph and communication history, as well as other types of information relating to a user's experience in social network 120 that necessarily flow therefrom.

The social network information may include information associated with database 700 and the services provided by social network 120 based on the weighted social graph. By way of example, the social network information may include presentation and delivery of social network activity, sorting of connections list based on weighting or most recent communications, communication history, communication preferences, presence information, and ranking of comments from connections, as previously described.

The social network information may be displayed (block 820). User device 110 may display the social network information (e.g., on display 425) to user 105. FIGS. 9-12 are diagrams illustrating exemplary graphical user interfaces (GUIs) that provide social network information, as described herein.

Although FIG. 8 illustrates an exemplary process 800, in other implementations, fewer, additional, or different operations may be performed.

Figure 9:
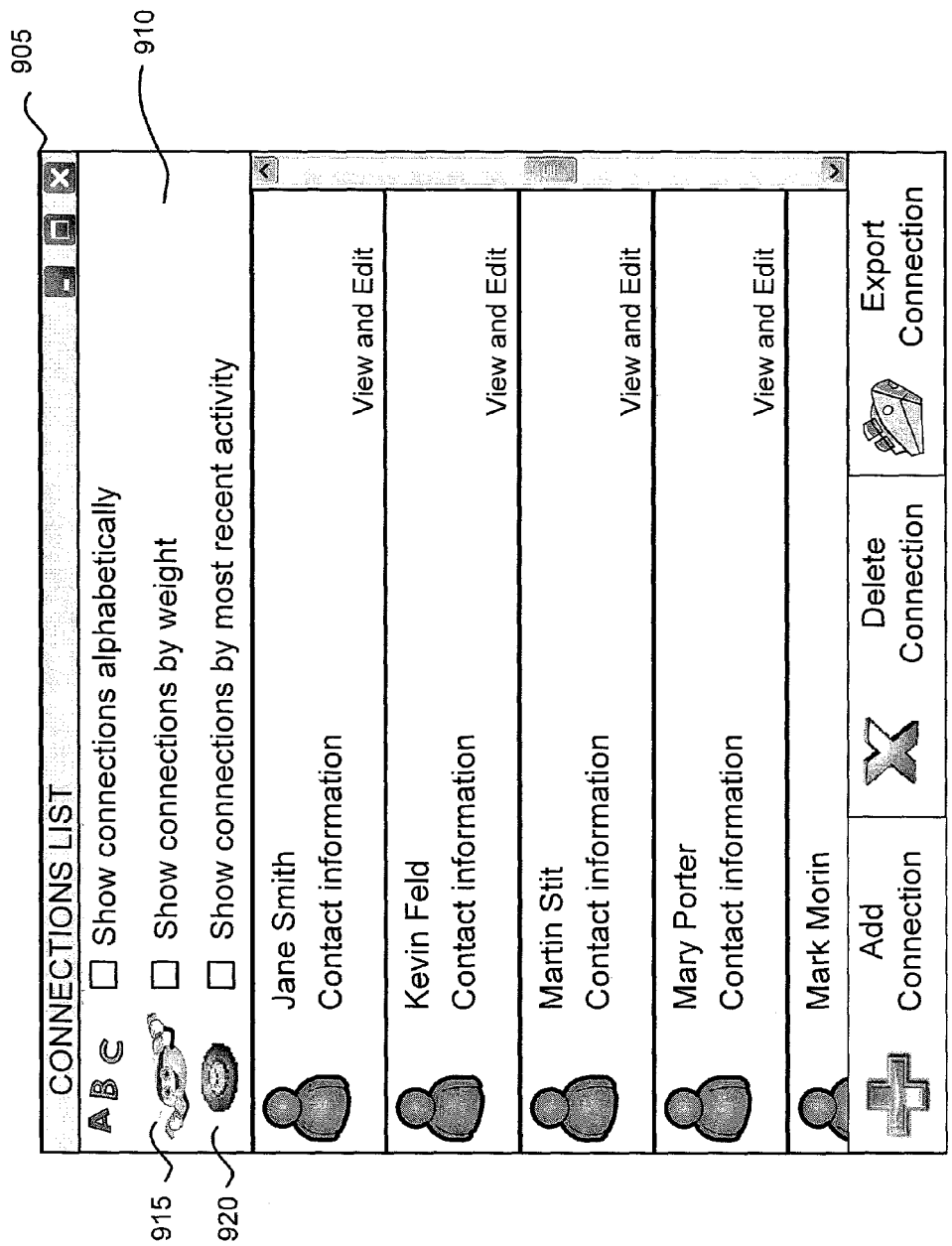
FIG. 9 is a diagram illustrating an exemplary graphical user interface (GUI) that shows social network information associated with connections lists.

FIG. 9 is a diagram illustrating an exemplary GUI that shows social network information associated with connections lists. As illustrated, a GUI 905 may include a menu 910. Menu 910 may include selectors 915 and 920. Selector 915 may permit user 105 to view connections in social network 120 based on the weighted relational links associated with his or her connections. Selector 920 may permit user 105 to view connections in social network 120 according to a temporal relationship with the communications (e.g., from most recent to least recent). In this way, user 105 may determine which connections that user 105 has not communicated with recently.

Figures 10A, 10B, 10C:
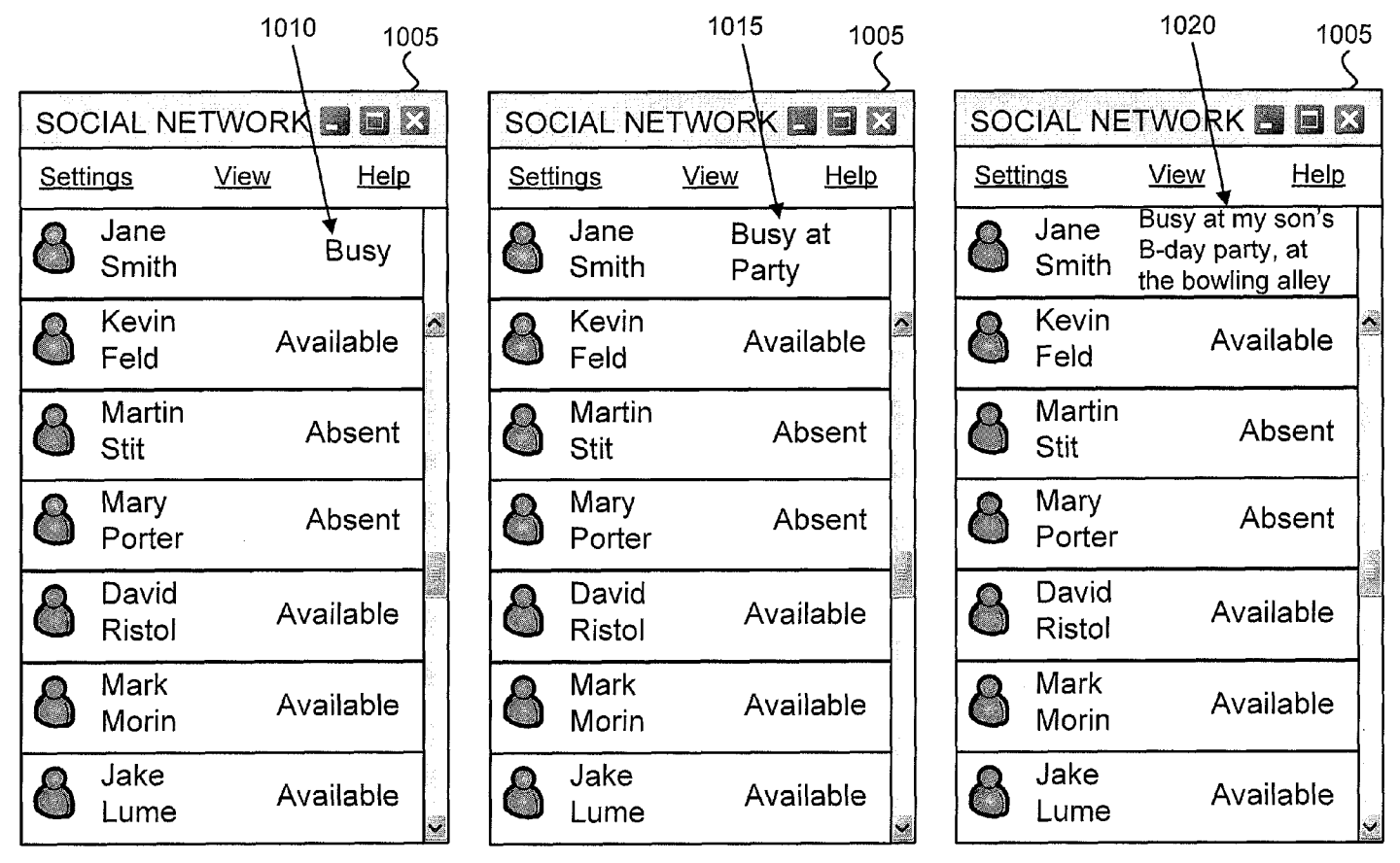

FIGS. 10A-10C are diagrams illustrating exemplary GUIs that show social network information associated with user presence information. As illustrated, a GUI 1005 may include various levels of user presence information based on the weighted relational links. For purposes of discussion, assume FIG. 10A corresponds to a GUI 1005 with respect to a connection assigned a low-weighted relational link, FIG. 10B corresponds to a GUI 1005 with respect to a connection assigned a medium-weighted relational link, and FIG. 10C corresponds to a GUI 1005 with respect to a connection assigned a high-weighted relational link. By comparing the presence information 1010, 1015, and 1020 in FIGS. 10A-10C, respectively, each connection is afforded a corresponding level of presence information of user 105. For example, as illustrated in FIG. 10A, the connection assigned the low-weighted relational link may see that user 105 is "busy" (as presence information). In FIG. 10B, the connection assigned the medium-weighted relational link may see that user 105 is "busy at party" (as presence information). In FIG. 10C, the connection assigned the high-weighted relational link may see that user 105 is "busy at my son's B-day party, at the bowling alley" (as presence information). User 105 may be permitted to provide varying levels of presence information to social network 120 based on user's 105 weighted social graph.

Figure 11:
FIG. 11 is a diagram illustrating an exemplary GUI that shows social network information having the user's communication history with this connection.

FIG. 11 is a diagram illustrating an exemplary GUI that shows social network information having the user's communication history with this connection. As illustrated, a GUI 1105 may include an activity label 1110 and corresponding window 1115 that shows a connection's activity on social network 120. GUI 1105 may include a contact history label 1120 and a corresponding window 1125 that shows user's 105 communication history with this connection. That is, window 1125 may include information based on session information that occurred outside of social network 120. Additionally, GUI 1105 may also include a preferred communication label 1130 and a corresponding preferred communication field 1135 that identifies a preferred method of communication for user 105 to communicate with this connection. In this example, preferred communication field 1135 indicates that a preferred method of communication with this contact is by e-mail.

Figure 12:
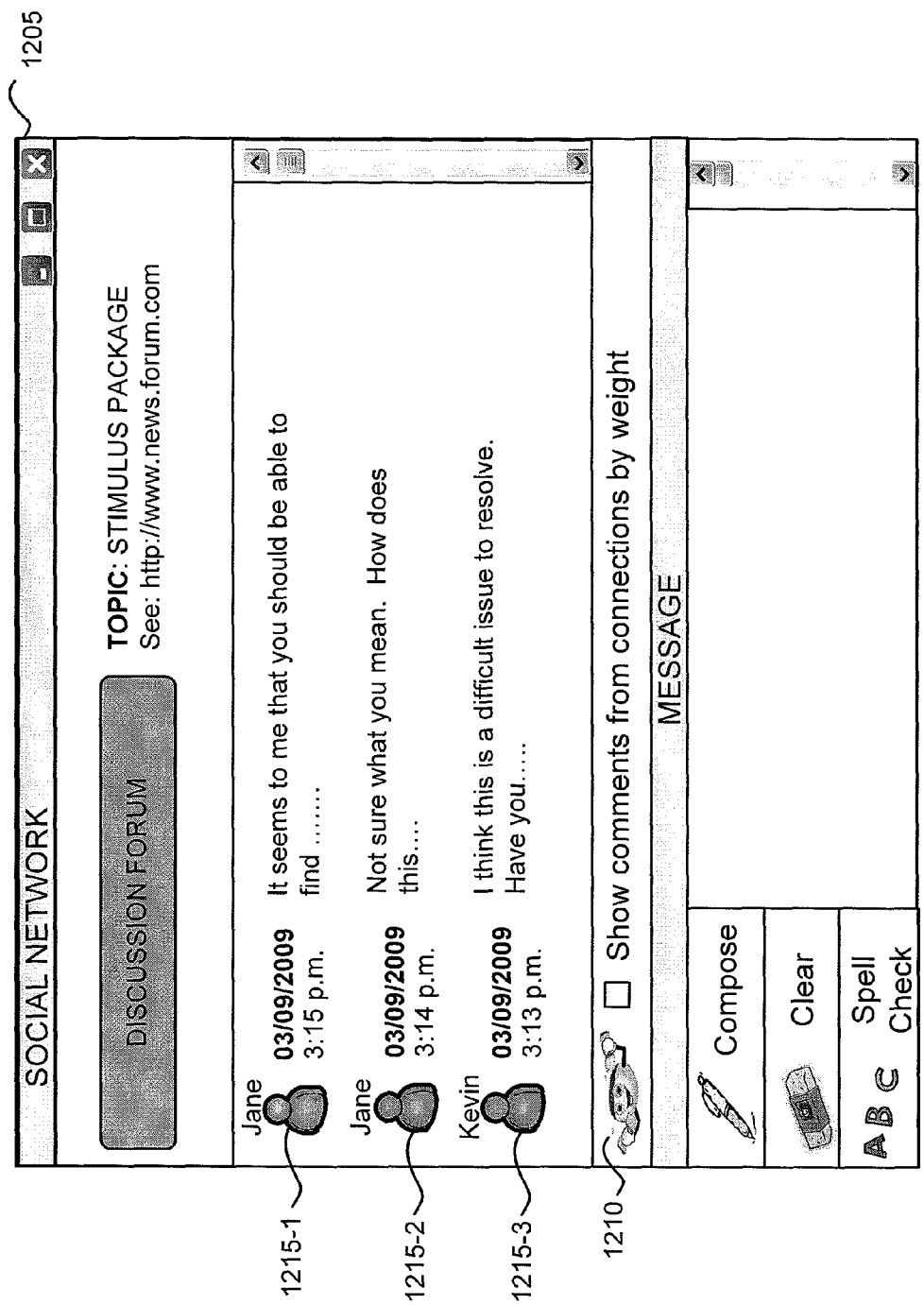
FIG. 12 is a diagram illustrating an exemplary GUI that shows social network information associated with ranking connections during a discussion forum.

FIG. 12 is a diagram illustrating an exemplary GUI that shows social network information associated with ranking connections during a discussion forum. As illustrated a GUI 1205 may provide a topic of discussion (e.g., the Stimulus Package). GUI 1205 may permit user 105 to view input (e.g., comments) from connections according to their assigned weight based on selector 1210. As illustrated, user 105 may see comments 1215-1, 1215-2, and 1215-3 (referred to generally as comments 1215) from connections, such as Jane and Kevin. The order of Jane's comments 1215-1 and 1215-2 may be listed before Kevin's comment 1215-3. That is, for example, Jane may be assigned a higher weighted relational link than Kevin. Social network 120 may also omit comments 1215 from connections that have a weighted relational link below a threshold value. In other implementations, social network 120 may not omit any comments 1215 with respect to user's 105 connections.

Figure 13:
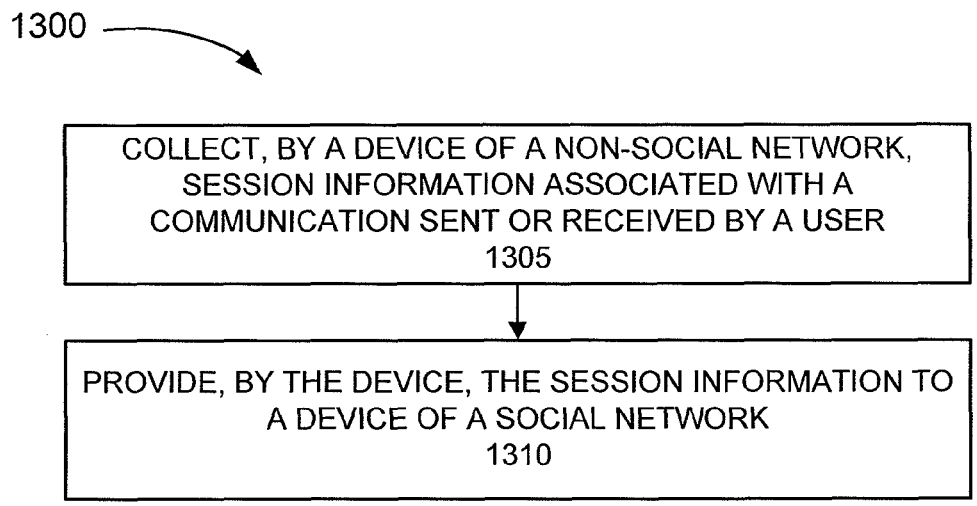
FIG. 13 is a flow diagram illustrating an exemplary process for providing session information to a social network.

FIG. 13 is a flow diagram illustrating an exemplary process 1300 for providing session information to a social network. In one implementation, process 1300 may be performed by, for example, IMS 205 and/or SRP 210. In other implementations, network devices or network systems, which obtain session information, although not specifically mentioned in the description, may perform process 1300.

Process 1300 may begin with collecting session information associated with communications sent or received by a user (block 1305). IMS 205 and/or SRP 210 may collect session information associated with communications sent or received by user 105. The communications may include, for example, telephone calls, e-mail, SMS, MMS, paging, video sessions and/or some other form of electronic communication. The session information may also include information, not specifically collected as a result of the communication, such as, for example, name and/or address information.

The session information may be provided to a social network (block 1310). In one implementation, IMS 205 and/or SRP 210 may transmit the session information to social network 120. In other implementations, social network 120 may retrieve the information from IMS 205, SRP 210, or another device (e.g., a repository or a data center). It will be appreciated that social network 120 may obtain the session information from network 115 in various ways depending on the arrangement. For example, in the instance that social network 120 is part of network 115 (e.g., the same service provider or network operator owns, operates, and/or manages network 115 and social network 120), the process of providing the session information to social network 120 may be different than the instance that social network 120 is not part of network 115 (e.g., the same service provider or network provider does not own, operate, and/or manage network 115 and social network 120).

Although FIG. 13 illustrates an exemplary process 1300, in other implementations, fewer, additional, or different operations may be performed.

Figure 14:
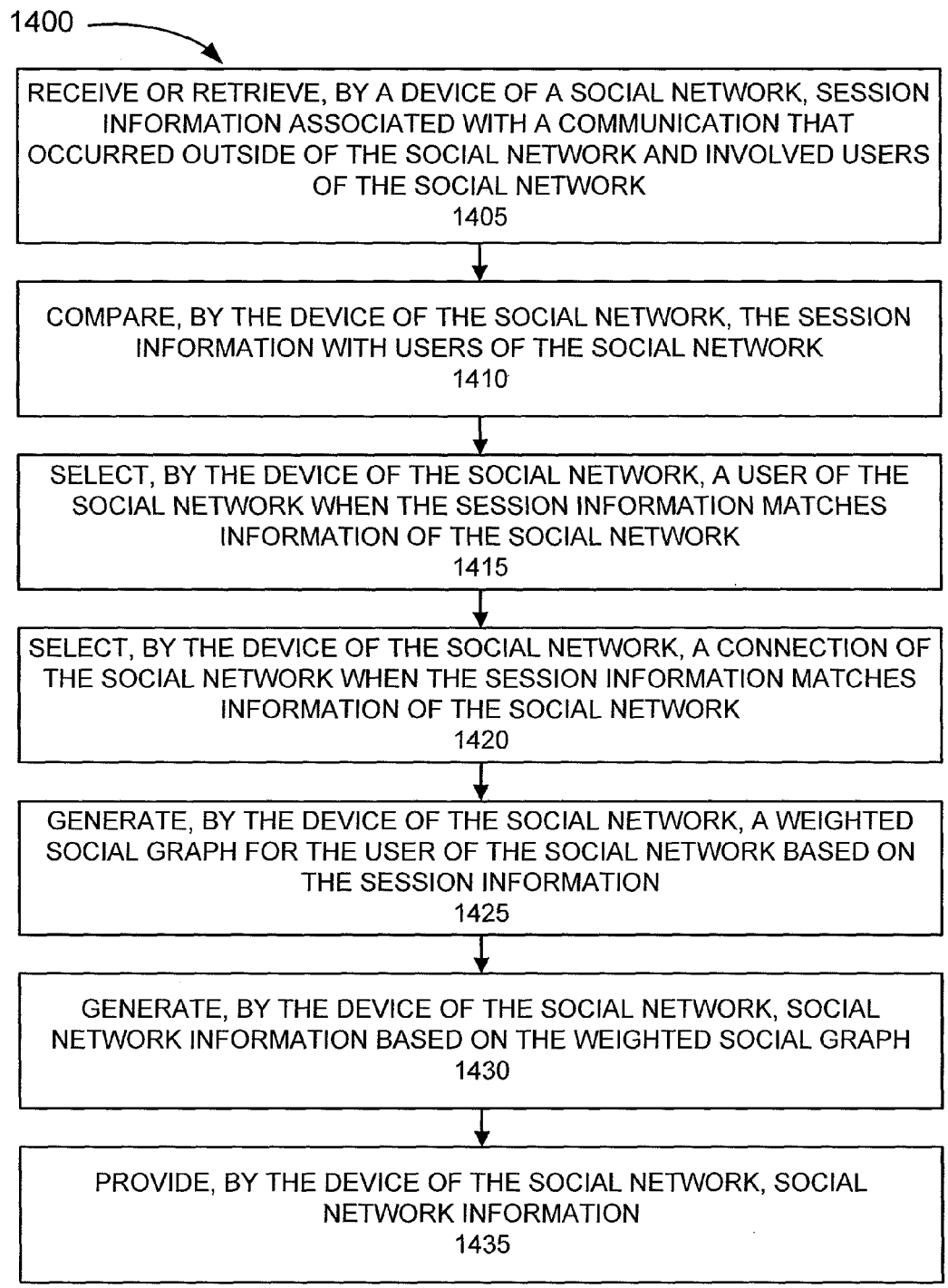
FIG. 14 is a flow diagram illustrating an exemplary process for providing social network information based on a weighted social graph.

FIG. 14 is a flow diagram illustrating an exemplary process 1400 for providing social network information based on a weighted social graph. In one implementation, process 1400 may be performed by, for example, SNW 215. It will be appreciated, however, that the functionality associated with SNW 215, as described herein, may be incorporated in one or multiple devices, and/or implemented in a centralized or a distributed manner. The one or multiple devices may include, for example, a server, a data center, a computer, or some other type of network device.

Process 1400 may begin with receiving or retrieving session information associated with a communication that occurred outside of a social network and involved users of the social network (block 1405). SNW 215 may receive from network 115 (e.g., IMS 205 and/or SRP 210) session information associated with a communication between users 105. Alternatively, SNW 215 may retrieve, from network 115 (e.g., IMS 205 and/or SRP 210), session information associated with a communication between users 105.

The session information may be compared with the users of the social network (block 1410). SNW 215 may compare the session information with information that social network 120 maintains on its users. For example, SNW 215 may compare telephone numbers, e-mail address, contact information, and/or session information that social network 120 maintains on its users with the session information received or retrieved from network 115.

A user of the social network may be selected when the session information matches information of the social network (block 1415). SNW 215 may select a user of social network 120 when the session information matches information of social network 120.

A connection of the social network may be selected when the session information matches information of the social network (block 1420). SNW 215 may select a connection of social network 120 when the session information matches information of social network 120. The connection will be a connection of the user selected in block 1420. It will be appreciated that SNW 215 may swap the selection of the user and the connection of the user. That is, when two or more users are involved in a communication, one user may be selected as the user of social network 120 and the remaining user(s) may be selected as connection(s) of the selected user. However, in another iteration with respect to the session information, SNW 215 may select another user as the user of social network 120 and the remaining user(s) may be selected as connection(s) of the selected user. SNW 215 may continue these iterations until each individual is selected as a user of the social network. Additionally, it will be appreciated that SNW 215 may correspondingly perform multiple iterations for the remaining operations described in blocks 1425, 1430, and 1435.

A weighed social graph for the user of the social network may be generated based on the session information (block 1425). SNW 215 may generate a weighted social graph for the user of the social network. For example, as previously described, SNW 215 may assign a weight to a relational link between the selected user and the selected connection. In instances when the weighted social graph already exists, SNW 215 may update the weight of the relational link.

Social network information may be generated based on the weighted social graph (block 1430). SNW 215 may generate social network information, as previously described. The social network information may include information based on the weighted social graph and/or the session information (e.g., communication history). By way of example, the social network information may include information associated with prioritizing the presentation of information (e.g., postings) to the user, information associated with the prioritizing of delivering communications to the user according to the user's weighted social graph. Additionally, the social network information may include, for example, information associated with the sorting of the user's connection list based on the user's weighted social graph, and/or the sorting of the user's connection list based on the most recent activity with the connection in the user's weighted social graph. The social network information may also include, for example, information associated with providing a detailed communication history with respect to connections in conjunction with the connection's activity history. The social network may prioritize an order in which the user may communicate with his or her connections based on the user's weighted social graph. The social network information may also include information that identifies a preferred form of communication with a connection. The social network information may include information to allow the user to control the level or degree of disclosure of presence of the user to his or her connections based on the user's weighted social graph. Also, the social network information may include information to allow a user to rank or prioritize input from connections during a discussion forum based on the user's weighted social graph.

Social network information may be provided (block 1435). SNW 215 may provide various services, as previously described herein, to the user of social network 120. The various services may be based on the user's weighted social graph and/or communication history.

Although FIG. 14 illustrates an exemplary process 1400, in other implementations, fewer, additional, or different operations may be performed.

According to the embodiments described herein, a social network may utilize a communication history to create and/or update a weighted social graph for users of the social network. The social network may provide various services based on the weighted social graph and/or the communication history.

The foregoing description of implementations provides illustration, but is not intended to be exhaustive or to limit the implementations to the precise form disclosed. Accordingly, modifications to the embodiments, implementations, etc., described herein may be possible. For example, one or more operations associated with exemplary processes 1300 and/or 1400 may be implemented in the user device.

The term "may" is used throughout this application and is intended to be interpreted, for example, as "having the potential to," "configured to," or "being able to," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

In addition, while series of blocks have been described with regard to the processes illustrated in FIGS. 8, 13, and 14, the order of the blocks may be modified in other implementations. Further, non-dependent blocks may be performed in parallel.

It will be apparent that the device(s) described herein may be implemented in many different forms of software or firmware in combination with hardware in the implementations illustrated in the figures. The actual software code (executable by hardware) or specialized control hardware used to implement these concepts does not limit the disclosure of the invention. Thus, the operation and behavior of a device(s) was described without reference to the specific software code—it being understood that software and control hardware can be designed to implement the concepts based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the implementations described herein unless explicitly described as such.

What is claimed is:

1. A method comprising:

receiving or retrieving session information, by a device of a social network site, associated with and collected from one or more sessions pertaining to one or more electronic communications that occurred outside of the social network site and included users that use the social network site;

comparing, by the device of the social network site, the session information with information of users that use the social network site, wherein the information includes social network profile information and social network activity information;

determining, by the device of the social network site, whether user identifiers included in the session information match user identifiers included in the social network profile information based on the comparing;

selecting, by the device of the social network site, one of the users as a selected user of the social network site and one or more of the users as one or more connections of the selected user of the social network site, based on determining that the user identifiers included in the session information match the user identifiers included in the social network profile information, wherein the selected user and the one or more of the users are participants of the one or more electronic communications that occurred outside of the social network site;

generating, by the device of the social network site, a weighted social graph for the selected user of the social network site, based on the session information;

generating, by the device of the social network site, social network information based on the weighted social graph; and providing, by the device of the social network site, social network services, based on the social network information, to at least one of a user device associated with the selected user of the social network site or one or more user devices associated with the selected one or more connections of the selected user of the social network site, when the selected user is connected to the social network site or the selected one or more connections of the selected user are connected to the social network site.

2. The method of claim 1, wherein the generating of the weighted social graph comprises:
assigning a weighted relational link, based on the session information, that corresponds to a measure of importance of the selected one or more connections toward the selected user, and the method further comprising:
using the social network services, by the selected user or the selected one or more connections of the selected user, in response to the providing.

3. The method of claim 2, wherein, when the session information includes a greater number of electronic communications between the selected user and one of the selected one or more connections than a number of electronic communications between the selected user and another one of the selected one or more connections, the assigning comprises:
assigning a greater measure of importance to the one of the selected one or more connections than a measure of importance assigned to the other one of the selected one or more connections.

4. The method of claim 1, wherein one of the social network services includes a social network connection's list that lists the selected user's social network connections, wherein the selected user's social network connections include the selected one or more connections, and the providing comprises:
providing, by the device of the social network site, the selected user's social network connection's list that lists the selected user's social network connections, in an order, according to one of:
the selected user's weighted social graph, wherein the selected user's weighted social graph assigns a relational importance level to the selected user's social network connections, from a perspective of the selected user, based on the session information, or
a most recent communication to a least recent communication, wherein the order of the most recent communication to the least recent communication is based on the session information with respect to each of the selected user's social network connections.

5. The method of claim 4, wherein one of the social network services include a presence list that includes social network presence information associated with the selected user, wherein a specificity of the social network presence information corresponds to a measure of importance, which is based on the selected user's weighted social graph, associated with each of the selected one or more connections, and the providing comprises:
providing, by the device of the social network site, the presence list that lists the selected user's social network connections and corresponding social network presence information.

6. The method of claim 1, wherein one of the social network services includes a historical communication list and a graphical element that indicates, based on the session information, a preferred method of communicating with the selected one or more connections of the selected user, and the providing comprises:
providing, by the device of the social network site, the historical communication list and the graphical element that indicates the preferred method of communicating with the selected one or more connections of the selected user.

7. The method of claim 1, wherein the social network information includes social network activity information of the selected one or more connections of the selected user, and the session information.

8. The method of claim 1, wherein the generating of the weighted social graph comprises:
assigning a weighted relational link, based on the session information and the social network activity information, that corresponds to a measure of importance of the selected one or more connections toward the selected user.

9. A device comprising:
a transceiver;
a memory to store instructions; and
a processor to execute the instructions in the memory to configure the processor to:
receive or retrieve session information associated with and collected from one or more sessions pertaining to one or more electronic communications that occurred outside of a social network site;
compare the session information with information associated with users of the social network site, wherein the information includes social network profile information and social network activity information;
determine whether user identifiers included in the session information match user identifiers included in the social network profile information based on a comparison;
select a user, based on a determination that the user identifiers included in the session information match the user identifiers included in the social network profile information, as one of the users of the social network site;
select one or more connections of the selected user, based on the compare, as one or more of the users of the social network site, when it is determined that one or more users associated with the session information are also one or more users that use the social network site, wherein the selected user and the one or more connections of the selected user are participants of the one or more electronic communications that occurred outside of the social network site;
generate a weighted social graph for the selected user, the weighted social graph including a weighted relational link that corresponds to a measure of importance of the selected one or more connections to the selected user;
generate social network information based on the weighted social graph; and
provide, via the transceiver, social network services, based on the social network information, to at least one of a user device associated with the selected user of the social network site or one or more user devices associated with the selected one or more connections of the selected user of the social network site, when the selected user is connected to the social network site or the selected one or more connections of the selected user are connected to the social network site.

10. The device of claim 9, wherein one of the social network services includes a social network connection's list that lists the selected one or more connections in an order, according to one of:
the user's weighted social graph; or
one of the selected one or more connections associated with a more recent one of the one or more electronic communications with the selected user to another one of the selected one or more connections associated with a less recent one of the one or more electronic communications with the selected user.

11. The device of claim 9, wherein one of the social network services includes a presence list that includes social network presence information associated with the selected user, wherein a specificity of the social network presence information corresponds to the measure of importance associated with each of the selected one or more connections.

12. The device of claim 9, wherein the social network information includes information for prioritizing comments from the selected one or more connections with respect to a discussion forum between the selected user and the selected one or more connections, wherein the prioritizing of comments corresponds to the measure of importance associated with each of the selected one or more connections.

13. The device of claim 9, wherein the social network information includes one or more of:
   information for prioritizing a presentation, to the selected user, of social network activity information of the selected one or more connections, based on the user's weighted social graph, or
   information for providing, to the selected user, an order in which the selected user communicates with the selected one or more connections, based on the user's weighted social graph.

14. The device of claim 9, wherein the social network information includes one or more of:
   communication history information between the selected user and one of the selected one or more connections, the communication history information including the session information that includes the one or more electronic communications between the selected user and the one of the selected one or more connections, or
   information for providing a preferred method of communicating with the one of the selected one or more connections based on the communication history information.

15. A non-transitory computer-readable storage medium containing instructions executable by at least one processor, the non-transitory computer-readable storage medium storing instructions for:
   comparing session information associated with and collected from one or more sessions pertaining to one or more electronic communications that occurred outside of an on-line social networking system that provides a social network with information stored by the on-line social network system, wherein the information includes at least one of social network profile information or social network activity information, and wherein the session information and the information each includes user identifiers;
   determining whether users of the social network are participants in the one or more electronic communications based on the comparing;
   selecting a user, as one of the users of the social network, in response to determining that one of the users of the social network was a participant in the one or more electronic communications;
   selecting one or more connections of the selected user, as one or more of the users of the social network, in response to determining that the one or more of the users were participants in the one or more electronic communications;
   generating a weighted social graph, pertaining to the selected user, that includes one or more weighted relational links that respectively indicate a measure of importance for each of the selected one or more connections;
   generating social network information based on the selected user's weighted social graph; and
   providing social network services, based on the social network information, to a user device associated with the selected user, when the selected user is connected to the on-line social networking system.

16. The non-transitory computer-readable storage medium of claim 15, wherein one of the social network services includes a social network connection's list that lists the selected one or more connections in an order according to the measure of importance for each of the selected one or more connections relative to the selected user.

17. The non-transitory computer-readable storage medium of claim 15, wherein one of the social network services includes a presence list that includes social network presence information of the selected user, wherein a specificity of the social network presence information corresponds to the measure of importance associated with each of the selected one or more connections relative to the selected user.

18. The non-transitory computer-readable storage medium of claim 15, wherein the social network information includes one or more of:
   information for prioritizing a presentation, to the selected user, social network activity information of the selected one or more connections, based on the selected user's weighted social graph, or
   information for providing, to the selected user, an order in which the selected user communicates with the selected one or more connections, based on the selected user's weighted social graph.

19. The non-transitory computer-readable storage medium of claim 15, wherein the social network information includes one or more of:
   communication history information between the selected user and one of the selected one or more connections, the communication history information including the session information that includes the one or more electronic communications between the selected user and the one of the selected one or more connections, or
   information for providing a preferred method of communicating with the one of the selected one or more connections based on the communication history information.

* * * * *